US012776002B2

(12) United States Patent
Oh et al.

(10) Patent No.: US 12,776,002 B2
(45) Date of Patent: Oct. 27, 2026

(54) APPARATUS AND METHOD FOR EXPRESSING MICROSCOPY DATA

(71) Applicant: ELECTRONICS AND TELECOMMUNICATIONS RESEARCH INSTITUTE, Daejeon (KR)

(72) Inventors: Kwan-Jung Oh, Daejeon (KR); Yongjun Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 419 days.

(21) Appl. No.: 18/370,085

(22) Filed: Sep. 19, 2023

(65) Prior Publication Data

US 2024/0153034 A1 May 9, 2024

(30) Foreign Application Priority Data

Nov. 3, 2022 (KR) ........................ 10-2022-0145491
Apr. 13, 2023 (KR) ........................ 10-2023-0048929

(51) Int. Cl.
*G06T 3/4053* (2024.01)
*G06T 5/00* (2024.01)
(Continued)

(52) U.S. Cl.
CPC .............. *G06T 3/4053* (2013.01); *G06T 5/00* (2013.01); *G06T 5/50* (2013.01); *G06T 7/70* (2017.01); *G06T 2207/10056* (2013.01)

(58) Field of Classification Search
None
See application file for complete search history.

(56) References Cited

U.S. PATENT DOCUMENTS 5,406,505 A 4/1995 Kang et al.
10,839,485 B2 11/2020 Lelescu et al.
(Continued)

FOREIGN PATENT DOCUMENTS

KR 10-1069209 B1 9/2011
KR 10-2020-0015804 A 2/2020
(Continued)

OTHER PUBLICATIONS

Brunello D, Calvagno G, Mian GA, Rinaldo R. Lossless compression of video using temporal information. IEEE Transactions on image Processing. Feb. 28, 2003;12(2): 132-9. (Year: 2003).*
(Continued)

*Primary Examiner* — Vincent Rudolph
*Assistant Examiner* — Meredith Taylor
(74) *Attorney, Agent, or Firm* — LRK PATENT LAW FIRM

(57) ABSTRACT

A method and apparatus for processing or compressing image data are disclosed. A method of processing or compressing image data, performed by an apparatus, according to an embodiment of the present disclosure may include obtaining a plurality of low-resolution images of a specific object through a microscope; and processing or compressing the plurality of low-resolution images, based on at least one of i) a first correlation between adjacent low-resolution images among the plurality of low-resolution images, or ii) a second correlation between a virtual low-resolution image corresponding to a location of a specific light emitting diode (LED) obtained through the plurality of low-resolution images and an actual low-resolution image corresponding to a location of the specific LED among the plurality of low-resolution images.

9 Claims, 7 Drawing Sheets

(51) Int. Cl.
*G06T 5/50* (2006.01)
*G06T 7/70* (2017.01)

(56) References Cited

U.S. PATENT DOCUMENTS

| | | | | |
|---|---|---|---|---|
| 11,393,075 | B2 | 7/2022 | Park et al. | |
| 2014/0118529 | A1 * | 5/2014 | Zheng | G21K 7/00 348/80 |

FOREIGN PATENT DOCUMENTS

| | | | |
|---|---|---|---|
| KR | 10-2021-0021893 A | | 3/2021 |
| KR | 10-2021-0135054 A | | 11/2021 |
| WO | 2021/053374 A1 | | 3/2021 |

OTHER PUBLICATIONS

Hou L, Wang H, Wang J, Xu M. Background-noise reduction for Fourier ptychographic microscopy based on an improved thresholding method. Current Optics and Photonics. Apr. 25, 2018;2(2):165-71. (Year: 2018).*

Guoan Zheng et al., "Wide-field, high-resolution Fourier ptychographic microscopy", Nature Photonics, vol. 7, Sep. 2013.

* cited by examiner

APPARATUS AND METHOD FOR EXPRESSING MICROSCOPY DATA

CROSS-REFERENCE TO RELATED APPLICATIONS

This application claims the benefit of earlier filing date and right of priority to Korean Application No. 10-2022-0145491, filed on Nov. 3, 2022, Korean Application No. 10-2023-0048929, filed on Apr. 13, 2023, the contents of which are all hereby incorporated by reference herein in their entirety.

BACKGROUND

1. Technical Field

The present disclosure relates to the field of microscopy data analysis, and more particularly to apparatus and methods for representing microscopy data.

2. Description of Related Art

A microscope refers to an instrument that enlarges and observes minute objects or microorganisms that cannot be observed with the naked eye. In general, a microscope may consist of an objective lens and an eyepiece. An objective lens refers to a lens that is close to an object to be observed, and generally has a short focal length and serves to create an enlarged real image of an object. The eyepiece means a magnifying glass for viewing a real image magnified by an objective lens. The magnification of the microscope may be determined as the product of the magnification of the objective lens and the magnification of the eyepiece.

As the magnification of the microscope increases, the actual image to be observed becomes darker, so a separate lighting device for irradiating the object is required.

Meanwhile, a method of performing phase retrieval using a reflection type Fourier Ptychographic Microscopy (FPM) has been devised. When using the reflection type FPM, there is an advantage that the phase can be calculated without a separate reference beam.

SUMMARY

The technical problem of the present disclosure is to provide a data expression apparatus and method for processing and compressing large-capacity Fourier Ptychographic microscope data.

In addition, a technical problem of the present disclosure is to provide an apparatus and method for processing an image using a correlation between a virtual low-resolution image obtained from a virtual high-resolution image and an actually obtained low-resolution image.

The technical problems to be achieved in the present disclosure are not limited to the technical tasks mentioned above, and other technical problems not mentioned will be clearly understood by those skilled in the art from the description below.

A method of processing or compressing image data, performed by an apparatus may include obtaining a plurality of low-resolution images of a specific object through a microscope; and processing or compressing the plurality of low-resolution images, based on at least one of i) a first correlation between adjacent low-resolution images among the plurality of low-resolution images, or ii) a second correlation between a virtual low-resolution image corresponding to a location of a specific light emitting diode (LED) obtained through the plurality of low-resolution images and an actual low-resolution image corresponding to a location of the specific LED among the plurality of low-resolution images.

In addition, each of the plurality of low-resolution images may be arranged based on a position of an LED corresponding to each of the plurality of low-resolution images, and a scanning direction of the arranged plurality of low-resolution images may be determined based on a direction of an low-resolution image having a highest first correlation and the specific low-resolution image based on the specific low-resolution image among the plurality of low-resolution images.

In addition, the microscope may include an LED array including at least one LED, and the specific low-resolution image may be obtained through an LED located in a central area of the LED array.

In addition, image data based on the plurality of low-resolution images may be generated and compressed by scanning the plurality of low-resolution images according to the determined scanning direction.

In addition, the obtaining a virtual low-resolution image corresponding to the position of the specific LED may comprise obtaining a virtual high-resolution image by applying a super resolution algorithm to a low-resolution image obtained through an LED located in a specific area among LED arrays included in the microscope; and obtaining a virtual low-resolution image corresponding to the position of the specific LED based on the virtual high-resolution image.

In addition, the LED located in the specific area may include an LED located in a central area of the LED array.

In addition, based on the virtual low-resolution image corresponding to the position of the specific LED, the actual low-resolution image corresponding to the position of the specific LED may be corrected.

In addition, based on an exposure value of light by the specific LED exceeding a threshold value or an incident angle of light irradiated by the specific LED exceeding a threshold range, the actual low-resolution image corresponding to the position of the specific LED may be corrected using the virtual low-resolution image corresponding to the position of the specific LED.

In one embodiment of the present disclosure, an apparatus for processing or compressing image data may include at least one memory; and at least one processor; and the at least one processor is configured to: obtain a plurality of low-resolution images of a specific object through a microscope; and process or compress the plurality of low-resolution images, based on at least one of i) a first correlation between adjacent low-resolution images among the plurality of low-resolution images, or ii) a second correlation between a virtual low-resolution image corresponding to a location of a specific light emitting diode (LED) obtained through the plurality of low-resolution images and an actual low-resolution image corresponding to a location of the specific LED among the plurality of low-resolution images.

In addition, the at least one processor may be configured to: obtain a virtual high-resolution image by applying a super resolution algorithm to a low-resolution image obtained through an LED located in a specific area among LED arrays included in the microscope; and obtain a virtual low-resolution image corresponding to the position of the specific LED based on the virtual high-resolution image.

According to an embodiment of the present disclosure, a system may include a microscope; and an apparatus for processing or compressing image data, and the microscope may obtain a plurality of low-resolution images of a specific object through a microscope; and the apparatus may process or compress the plurality of low-resolution images, based on at least one of i) a first correlation between adjacent low-resolution images among the plurality of low-resolution images, or ii) a second correlation between a virtual low-resolution image corresponding to a location of a specific light emitting diode (LED) obtained through the plurality of low-resolution images and an actual low-resolution image corresponding to a location of the specific LED among the plurality of low-resolution images.

The features briefly summarized above with respect to the disclosure are merely exemplary aspects of the detailed description of the disclosure that follows, and do not limit the scope of the disclosure.

According to various embodiments of the present disclosure, a data expression apparatus and method for processing and compressing large-capacity Fourier typographic microscope data may be provided.

Also, according to various embodiments of the present disclosure, an apparatus and method for processing an image using a correlation between a virtual low-resolution image obtained from a virtual high-resolution image and an actually obtained low-resolution image may be provided.

The effects obtainable in the present disclosure are not limited to the effects mentioned above, and other effects not mentioned will be clearly understood by those skilled in the art from the description below.

BRIEF DESCRIPTION OF THE DRAWINGS

The accompanying drawings included as part of the detailed description to facilitate understanding of the present disclosure provide embodiments of the present disclosure and describe technical features of the present disclosure along with detailed descriptions.

DETAILED DESCRIPTION

Figure 1:
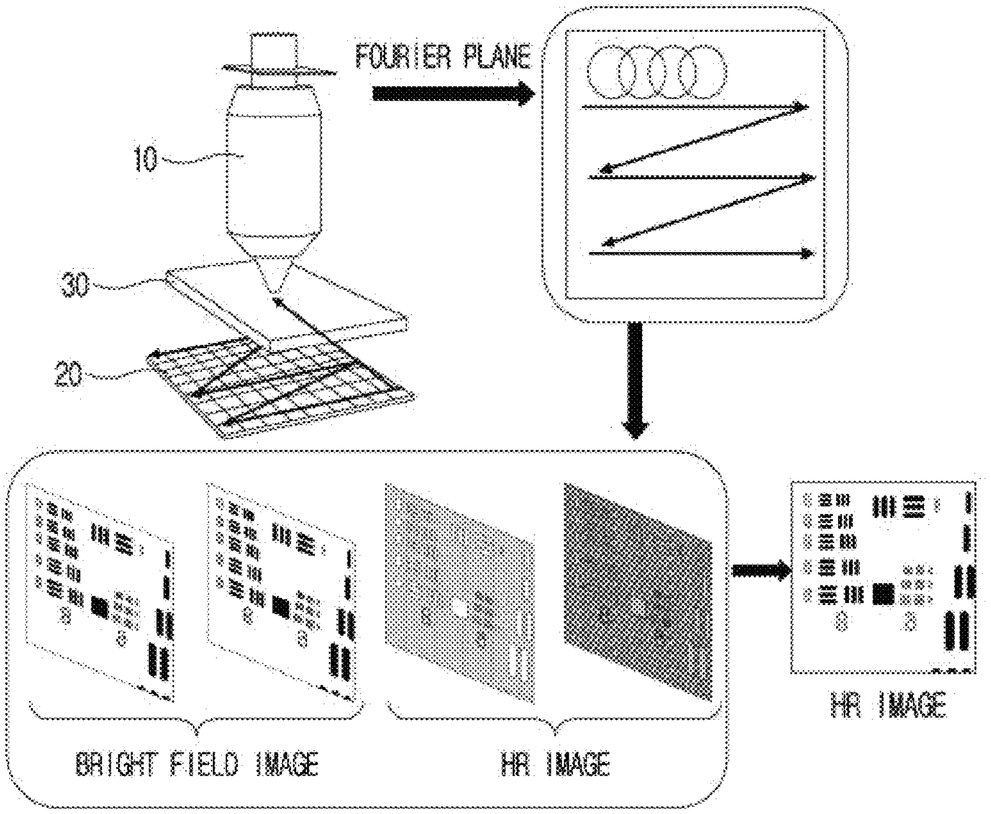
FIG. 1 is a diagram for describing a method of generating a high-resolution image according to an FPM according to an embodiment of the present disclosure.

Since the present disclosure can make various changes and have various embodiments, specific embodiments are illustrated in the drawings and described in detail in the detailed description. However, this is not intended to limit the present disclosure to specific embodiments, and should be understood to include all modifications, equivalents, and substitutes included in the idea and scope of the present disclosure. Similar reference numbers in the drawings indicate the same or similar function throughout the various aspects. The shapes and sizes of elements in the drawings may be exaggerated for clarity. Detailed description of exemplary embodiments to be described later refers to the accompanying drawings, which illustrate specific embodiments by way of example. These embodiments are described in sufficient detail to enable those skilled in the art to practice the embodiments. It should be understood that the various embodiments are different, but need not be mutually exclusive. For example, specific shapes, structures, and characteristics described herein may be implemented in another embodiment without departing from the idea and scope of the present disclosure in connection with one embodiment. Additionally, it should be understood that the location or arrangement of individual components within each disclosed embodiment may be changed without departing from the spirit and scope of the embodiment. Accordingly, the detailed description set forth below is not to be taken in a limiting sense, and the scope of the exemplary embodiments, if properly described, is limited only by the appended claims, along with all equivalents as claimed by those claims.

In this disclosure, terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present disclosure. The term and/or includes a combination of a plurality of related recited items or any one of a plurality of related recited items.

When an element of the present disclosure is referred to as being "connected" or "connected" to another element, it may be directly connected or connected to the other element, but it should be understood that other components may exist in the middle. On the other hand, when an element is referred to as "directly connected" or "directly connected" to another element, it should be understood that no other element exists in the middle.

Components appearing in the embodiments of the present disclosure are shown independently to represent different characteristic functions, and do not mean that each component is composed of separate hardware or a single software component. That is, each component is listed and included as each component for convenience of description, and at least two components of each component are combined to form one component, or one component can be divided into a plurality of components to perform functions. An integrated embodiment and a separate embodiment of each of these components are also included in the scope of the present disclosure unless departing from the essence of the present disclosure.

Terms used in the present disclosure are only used to describe specific embodiments, and are not intended to limit the present disclosure. Singular expressions include plural expressions unless the context clearly dictates otherwise. In the present disclosure, terms such as "comprise" or "have" are intended to designate that there are features, numbers, steps, operations, components, parts, or combinations thereof described in the specification, and it should be understood that this does not preclude the possibility of the presence or addition of one or more other features, numbers, steps, operations, components, parts, or combinations thereof. That is, the description of "including" a specific configuration in the present disclosure does not exclude configurations other than the corresponding configuration, and means that additional configurations may be included in the practice of the present disclosure or the scope of the technical spirit of the present disclosure.

Some of the components of the present disclosure may be optional components for improving performance rather than essential components that perform essential functions in the present disclosure. The present disclosure may be implemented including only components essential to implement the essence of the present disclosure, excluding components used for performance improvement, and a structure including only essential components excluding optional components used only for performance improvement is also included in the scope of the present disclosure.

Hereinafter, embodiments of the present disclosure will be described in detail with reference to the drawings. In describing the embodiments of this specification, if it is determined that a detailed description of a related known configuration or function may obscure the gist of the present specification, the detailed description will be omitted. The same reference numerals are used for the same components in the drawings, and redundant descriptions of the same components are omitted.

The system and/or method/device (hereinafter simply referred to as 'system') proposed in the present disclosure relates to a data representation technology that efficiently processes and compresses large amounts of microscopic data.

Here, the microscope may include a reflection-type Fourier ptychographic microscopy (FPM), but is not limited thereto. The microscope described in FIG. 6 may be implemented with various types of FPMs, transmission microscopes, reflection microscopes, optical microscopes, and/or electron microscopes.

Hereinafter, for convenience of description of the present disclosure, a device/system for controlling/managing a reflective FPM is assumed, but is not limited thereto. In describing the present disclosure, it is understood that the reflection type FPM may be replaced by other types of microscopes (e.g., transmission type microscopes, etc.).

The FPM can create/restore images and phases that exceed the optical limits of the optical module by merging a plurality of low-magnification/low-resolution measurement data (i.e., image or/and video) acquired using a plurality of light sources irradiated from various angles in the Fourier domain.

The performance of the FPM may be determined depending on the number of angles at which the light source for acquiring low magnification/low resolution measurement data is irradiated and/or whether the Fourier space can be filled by acquiring the low magnification/low resolution measurement data irradiated at the angle.

In order to improve the performance of FPM, low-magnification/low-resolution measurement data may be acquired through light sources irradiated at various angles, and accordingly, the size/amount of measurement data to be processed and stored may increase.

Hereinafter, a method and apparatus for efficiently processing and compressing a large amount of measurement data obtained through FPM will be described.

FIG. 1 is a diagram for describing a method of generating a high-resolution image according to an FPM according to an embodiment of the present disclosure.

The FPM may include an objective lens 10, an LED array 20 composed of one or more LEDs, and a camera. One or more LEDs constituting the LED array 20 may be activated (i.e., turned on) according to a predefined order (e.g., sequentially, etc.). The FPM may acquire a plurality of low-resolution images of the sample (e.g., the sample including the measurement sample) 30 through light irradiated from LEDs activated according to a predefined sequence.

A single image acquired by the FPM through a specific LED is an image obtained through a lens included in the FPM and a specific LED. Therefore, the resolution of a single image cannot exceed the optical limit of the lens and wavelength included in the FPM.

The Fourier ptychographic technique relates to a technique for creating a high-resolution image beyond the optical limit of a microscope by matching a plurality of low-resolution images in a Fourier space.

FIG. 1 shows a case in which a rectangular LED array 20 is configured as one or more LEDs are arranged in a rectangular shape, but this is only one embodiment. The LED array 20 may be configured in various shapes such as a concentric circle shape and an irregular shape. That is, the shape of the LED array 20 is not limited to a rectangle.

Figure 2:
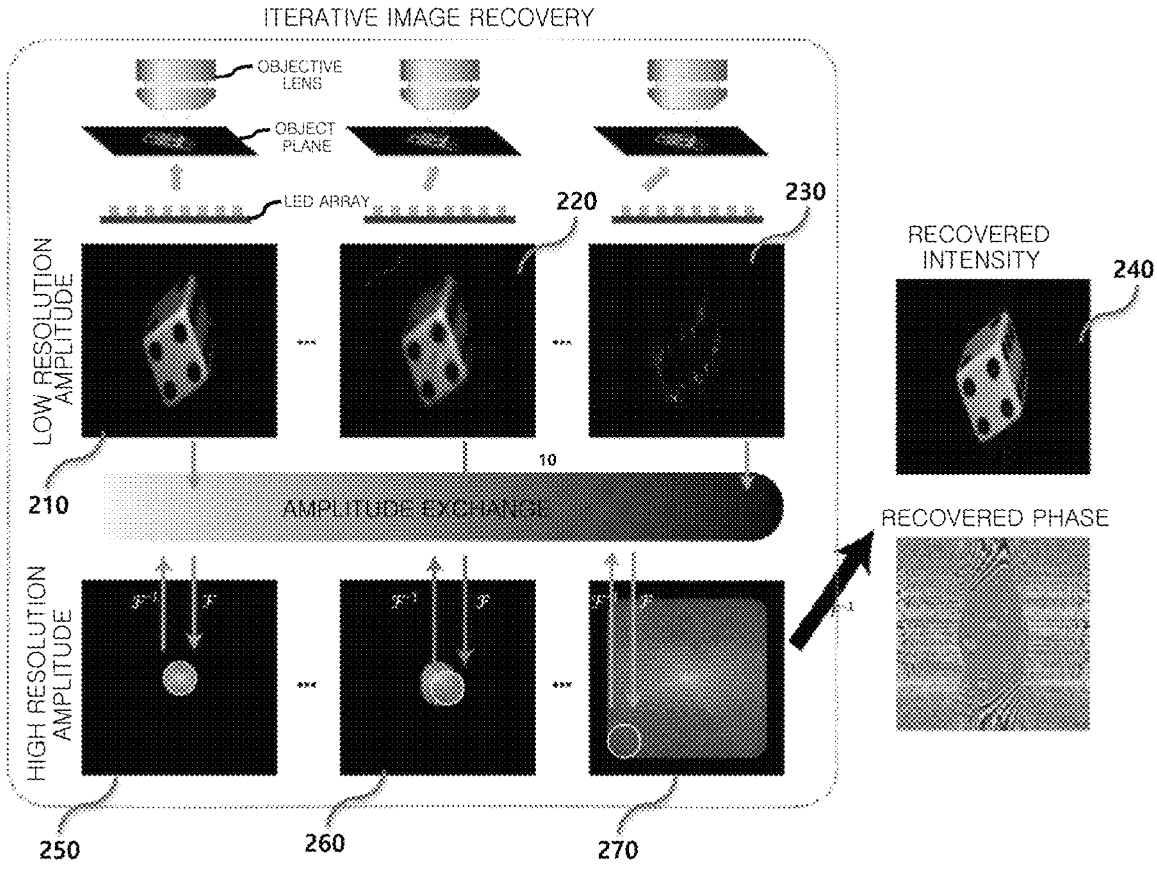
FIG. 2 is a diagram for describing a method of generating and restoring high-resolution images and phases through iterative optimization of FPM according to an embodiment of the present disclosure.

FIG. 2 is a diagram for describing a method of generating and restoring high-resolution images and phases through iterative optimization of FPM according to an embodiment of the present disclosure.

The FPM may acquire a plurality of low-resolution images 210, 220, and 230 through the LED array. Specifically, the FPM may obtain the first low-resolution image 210 by radiating light to the object in a first direction through an LED array. For example, the FPM may radiate light to an object in a first direction by activating an LED corresponding to the first direction in the LED array.

Through the above-described method, the FPM may acquire the second low-resolution image 220 and the third low-resolution image 230 by radiating light to the object in the second and third directions through the LED array.

The FPM or/and the electronic device that has acquired the plurality of low-resolution images 210, 220, and 230 from the FPM may obtain/restore the high-resolution image by stitching the plurality of low-resolution images 210, 220, and 230 in a Fourier space.

Specifically, the FPM or/and the electronic device may obtain the high-resolution images 250, 260, and 270 in the Fourier domain from the plurality of low-resolution images 210, 220, and 230. In this case, information on a partial region of the high-resolution images 250, 260, and 270 in the Fourier domain may be the same as information on a single low-resolution image 210, 220, and 230 obtained from the LED array.

The FPM or/and the electronic device may reconstruct the high-resolution image 240 and the phase information by iteratively transforming and optimizing each image into a Fourier domain and an image domain.

Figure 3:
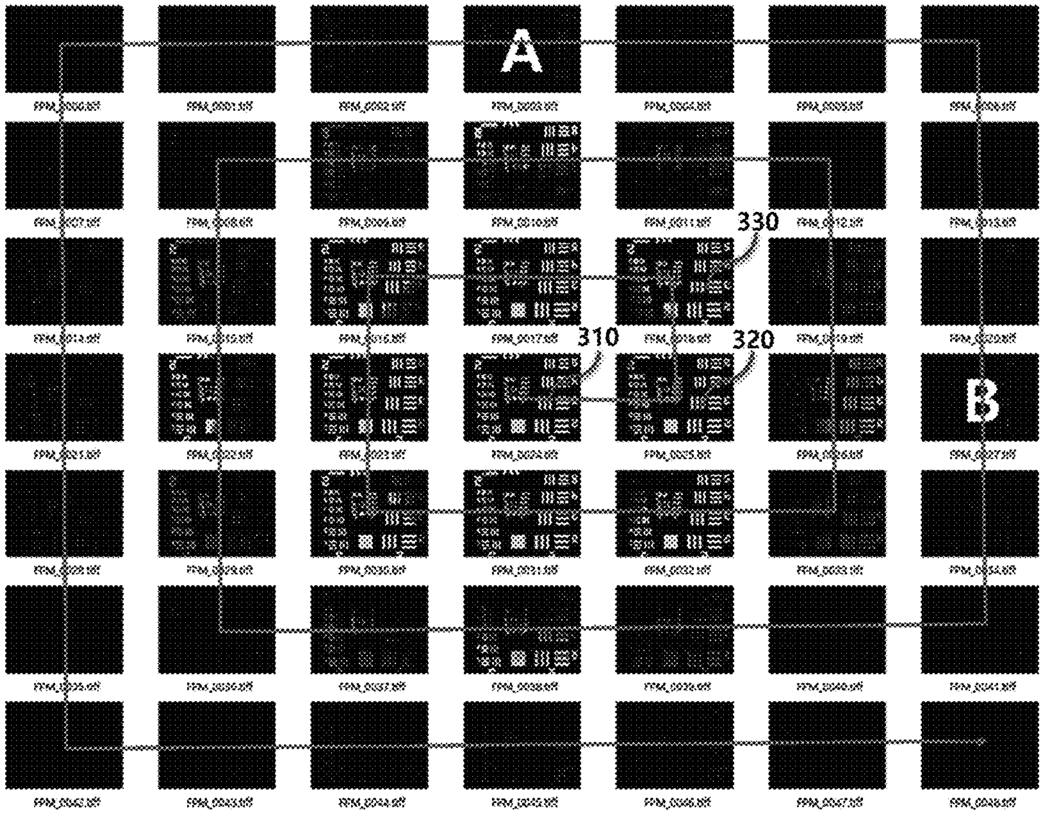
FIG. 3 shows an example of FPM data obtained through a two-dimensional array type LED that can be applied to the present disclosure.

FIG. 3 shows an example of FPM data obtained through a two-dimensional array type LED that may be applied to the present disclosure.

As shown in FIG. 3, FPM data obtained through a 2D array type LED has a form similar to a multi-view image in the field of 3D imaging. However, since the FPM data is composed of a plurality of image data acquired by changing the position of an activated LED, there is no disparity unlike multi-view images.

When FPM data (e.g., low-resolution image data, etc.) is scanned in the direction of the arrow shown in FIG. 3, the FPM data may be expressed like a video composed of continuous images. In this case, the degree of correlation between successive images may vary according to the scanning order. Since the correlation between low-resolution images taken from adjacent LEDs is relatively high, the scanning order may be determined based on the direction of images taken from adjacent LEDs.

Here, an image of a relatively bright component located at the center of the FPM data may be referred to as a bright field image (e.g., an image obtained through an LED located in the central area of an LED array), and dark images near an edge may be collectively referred to as a dark field image.

Specifically, the brightfield image is an image obtained by irradiating an object with an LED of a center portion among a plurality of LEDs constituting an LED array, and the dark field image is an image obtained by irradiating an object with LEDs at an edge of a plurality of LEDs constituting the LED array.

Additionally or alternatively, a scanning order or/and direction may be determined in the direction of the darkfield image relative to the brightfield image. That is, scanning may be performed in a direction of an image obtained through an LED located near an edge based on an image obtained through an LED located in a central region. Specifically, scanning may be performed in a continuous/adjacent image direction (i.e., an image direction in which a relatively dark field image exists rather than the corresponding image) based on the image acquired through the LED located in the central region.

Figure 4A:
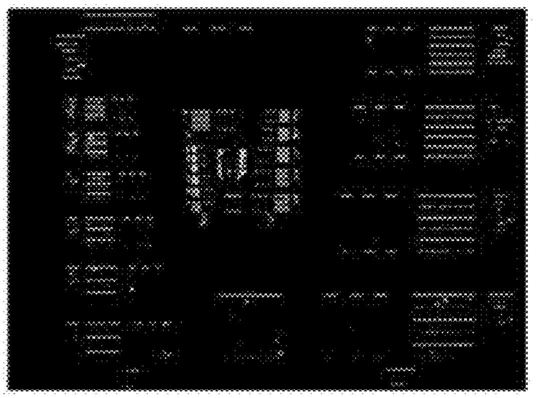
FIG. 4A and FIG. 4B illustrate a darkfield image that can be applied to the present disclosure.
Figure 4B:
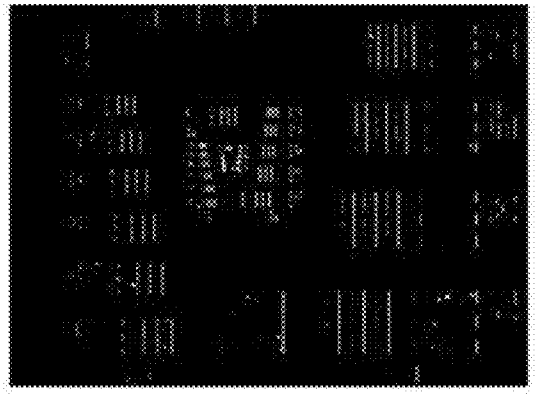

FIG. 4A and FIG. 4B illustrate a darkfield image that may be applied to the present disclosure Specifically, FIG. 4A is an enlarged image of a position A of FIG. 3, and FIG. 4B is an enlarged image of a position B of FIG. 3.

As shown in FIG. 4A and FIG. 4B, the dark field image has only high frequency components in a specific direction. High-frequency components in a specific direction cannot be obtained through brightfield images. Accordingly, when reconstructing and generating a high-resolution image, a high-frequency component in a specific direction acquired through a darkfield image may be used to fill a high-frequency component region at a position corresponding to a specific direction on the Fourier space.

Figure 5:
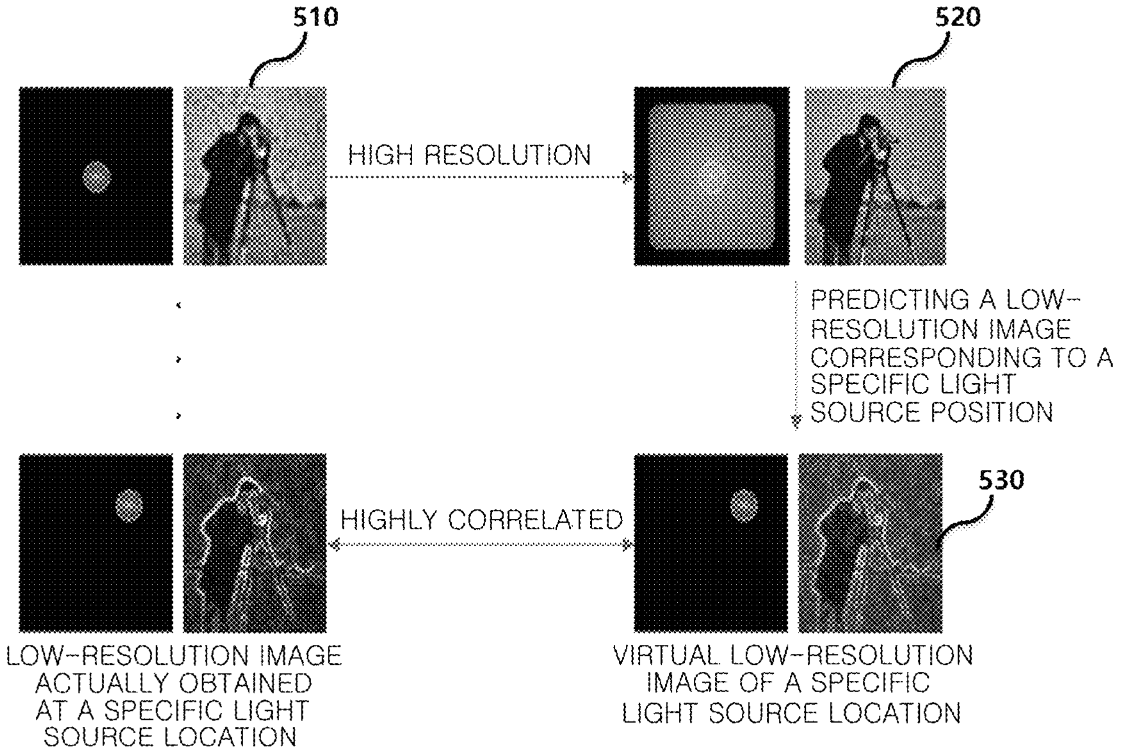
FIG. 5 is a diagram for describing a method of generating a virtual low-resolution image using image resolution, according to an embodiment of the present disclosure.

FIG. 5 is a diagram for describing a method of generating a virtual low-resolution image using image resolution, according to an embodiment of the present disclosure.

Image high resolution (super resolution) technology means a technology for generating a high-resolution image through a low-resolution image. Recently, a high resolution image technology using a deep learning algorithm may generate a high resolution image from a low resolution image more efficiently.

The basic image resolution technology is a technology that increases image resolution based on software, not a technology that increases image resolution by an optical method such as FPM. The present disclosure proposes a method of expressing data more efficiently by applying image resolution technology to FPM data.

As shown in FIG. 5, the FPM may acquire a low-resolution image 510 through light emitted from a central light source. The FPM or/and the electronic device that obtains the low resolution image 510 from the FPM may obtain a virtual high resolution image 520 by applying an image high resolution algorithm to the low resolution image 510.

However, the virtual high-resolution image 520 is an image derived by a software method rather than an optical method. Therefore, the accuracy of the virtual high-resolution image 520 is degraded, and phase information cannot be restored based thereon.

Accordingly, the FPM or/and device may generate a virtual low-resolution image 530 corresponding to a specific light source position in the virtual high-resolution image 520. In this case, a correlation between a virtual low-resolution image 530 corresponding to a specific light source position and an actually acquired low-resolution image 540 corresponding to a specific light source position may be high. The FPM or/and the electronic device may process or compress the low-resolution image 540 corresponding to the location of the specific light source that is actually acquired using the correlation between the virtual low-resolution image 530 corresponding to a specific light source position and the actually obtained low-resolution image 540 corresponding to a specific light source position.

That is, the FPM or/and the electronic device may use correlation with the virtual low-resolution image when processing or compressing the low-resolution image.

Figure 6:
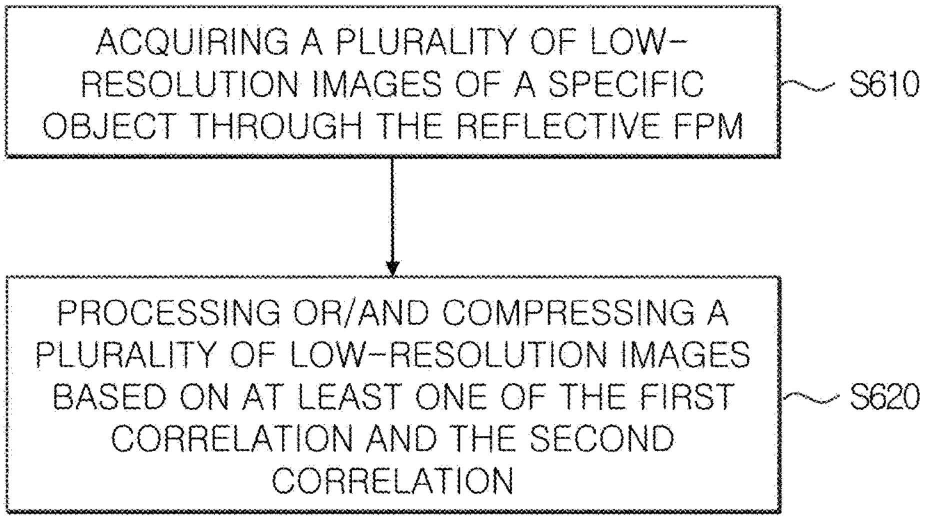
FIG. 6 is a flowchart illustrating a method of processing microscope data according to an embodiment of the present disclosure.

FIG. 6 is a flowchart illustrating a method of processing microscope data according to an embodiment of the present disclosure.

The device described with reference to FIG. 6 may include a device built into the microscope and/or a device existing outside the reflective FPM. The type of device existing outside the reflective FPM may be implemented as a desktop, smart phone, notebook, tablet PC, wearable device, server device, etc., but is not limited thereto.

Here, the microscope may include a reflection-type Fourier ptychographic microscopy (FPM), but is not limited thereto. The microscope described in FIG. 6 may be implemented with various types of FPMs, optical microscopes, and/or electron microscopes.

Hereinafter, for convenience of description of the present disclosure, a device/system for controlling/managing a reflective FPM is assumed, but is not limited thereto. In describing the present disclosure, it is understood that the reflection type FPM may be replaced by other types of microscopes.

A system composed of a reflective FPM and a device may perform image processing and expression operations according to a method described below.

The device may acquire a plurality of low-resolution images of a specific object through the reflective FPM S610. Here, the specific object means an object to be measured, and may include a measurement sample or/and a sample.

Specifically, the reflective FPM may acquire a plurality of low-resolution images of a specific object by using an LED array composed of a plurality of LEDs. For example, the reflective FPM may activate (i.e., turn on) each of a plurality of LEDs constituting the LED array sequentially (or in a predetermined order). The reflective FPM may acquire a plurality of low-resolution images by using light emitted as each of a plurality of LEDs is activated.

That is, the reflective FPM may acquire a plurality of low-resolution images of a specific object through a built-in camera, objective lens, and LED array.

As described above, the shape of the LED array may be configured in an irregular shape as well as a rectangle and a concentric circle.

The device may be communicatively connected to the reflective FPM by wire or wirelessly. For example, the device may acquire a plurality of low-resolution images through a cable connected to the reflective FPM. As another example, the device may obtain a plurality of low-resolution images from the reflective FPM through a wireless communication module.

If the device is equipped with a reflective FPM, the device may process an image acquired through the reflective FPM as it is.

FIG. 6 illustrates a case in which the light source of the reflective FPM is implemented as an LED, but is not limited thereto. Light sources of the reflective FPM may be implemented with various types of light sources.

The device may process or/and compress a plurality of low-resolution images based on at least one of the first correlation and the second correlation S620. The degree of correlation of the present disclosure may be expressed as a degree of association or a degree of similarity.

Here, the first correlation may mean a correlation between adjacent low-resolution images among a plurality of low-resolution images. That is, the first degree of correlation may indicate similarity or relatedness between adjacent low-resolution images among a plurality of low-resolution images.

Additionally or alternatively, the degree of correlation between images may increase as the number of overlapping/overlapping regions between images in the Fourier domain increases. That is, the device may determine the degree of correlation between corresponding images according to overlapping/overlapping areas between images in the Fourier domain.

Specifically, the device may arrange each of the plurality of low-resolution images based on the position of the light source corresponding to each of the plurality of low-resolution images.

As shown in FIG. 3, the device may arrange a low-resolution image obtained through light irradiated from an LED located in the center of an LED array in the center. In addition, the device may arrange low-resolution images acquired through light irradiated from LEDs located at the edges of the LED array (e.g., LEDs located at A and B in FIG. 3) at the edge positions.

The device may determine a scanning direction of the plurality of low-resolution images arranged based on a low-resolution image direction having the highest first correlation with the specific low-resolution image, based on the specific low-resolution image among the plurality of low-resolution images. For example, a specific low-resolution image may be obtained with an LED located in a central region of the array of LEDs (i.e., the LED forming the brightfield illumination).

For example, as shown in FIG. 3, scanning may be performed in the direction of the first low-resolution image (i.e., images adjacent to certain low-resolution images) 320 having the highest first correlation, based on the specific low-resolution image 310 obtained through the light emitted from the centrally located LED. Also, scanning may be performed in the direction of the second low-resolution image 330 having the highest first correlation based on the first low-resolution image 320. As the above-described rule is repeatedly performed, scanning may be performed in the direction of the arrow shown in FIG. 3.

The device may scan the plurality of low-resolution images according to a scanning direction determined based on adjacent low-resolution images having a high first correlation among the plurality of low-resolution images, and accordingly, image data based on a plurality of low-resolution images may be generated and/or compressed.

As scanning is performed along images with high correlation, image data based on a plurality of low-resolution images may be generated/compressed more efficiently.

Additionally or alternatively, the device may process or compress multiple low-resolution images based on the second correlation between the virtual low-resolution image corresponding to the position of the specific LED obtained through the plurality of low-resolution images and the actual low-resolution image corresponding to the position of the specific LED among the plurality of low-resolution images.

Specifically, the device may obtain a virtual high-resolution image by applying a super resolution algorithm (based on deep learning) to a low-resolution image acquired through LEDs located in a specific area among the LED array.

For example, the device may obtain a virtual high-resolution image by inputting a low-resolution image obtained through an LED located in a specific area to an artificial intelligence model learned to execute a high-resolution algorithm.

Here, the LED located in the specific area may be an LED located in the central area of the LED array, but is not limited thereto. The LED located in the specific area may be any LED in the LED array.

The device may acquire a virtual low-resolution image corresponding to a location of a specific LED from the virtual high-resolution image. For example, the device may predict a virtual low-resolution image corresponding to a location of a specific LED from a virtual high-resolution image.

At this time, the device may process (e.g., image correction, etc.) or compress a low-resolution image corresponding to the position of a specific LED using the second correlation between the actual low-resolution image corresponding to the position of the specific LED and the virtual low-resolution image corresponding to the specific LED position.

That is, the device may process or compress the plurality of low-resolution images by using the second correlation between the actual low-resolution image and the virtual low-resolution image corresponding to each of the plurality of LEDs included in the LED array.

For example, the device may utilize a virtual low-resolution image corresponding to a location of a specific LED as a reference image. In addition, the device may correct the actual low-resolution image corresponding to the position of the specific LED based on the virtual low-resolution image corresponding to the position of the specific LED.

Specifically, the device may detect/determine that an exposure value of light by a specific LED exceeds a threshold value or an incident angle of light emitted by the specific LED exceeds a threshold range. In this case, an actual low-resolution image obtained through a specific LED (i.e., an actual low-resolution image corresponding to a position of a specific LED) may require correction.

Therefore, since the second correlation between the virtual low-resolution image corresponding to the position of the specific LED and the actual low-resolution image corresponding to the position of the specific LED has a high value, the device may use the virtual low-resolution image corresponding to the position of the specific LED to correct the actual low-resolution image corresponding to the position of the specific LED.

Additionally or alternatively, the device may process or compress the plurality of low resolution images using both the first degree of correlation and the second degree of correlation. That is, while processing and compressing a plurality of low-resolution images using a first correlation between adjacent low-resolution images among the plurality of low-resolution images, the device may process and compress the actual low-resolution image corresponding to the position of the specific LED by using the second correlation between the virtual and actual low-resolution image corresponding to the position of the specific LED.

Figure 7:
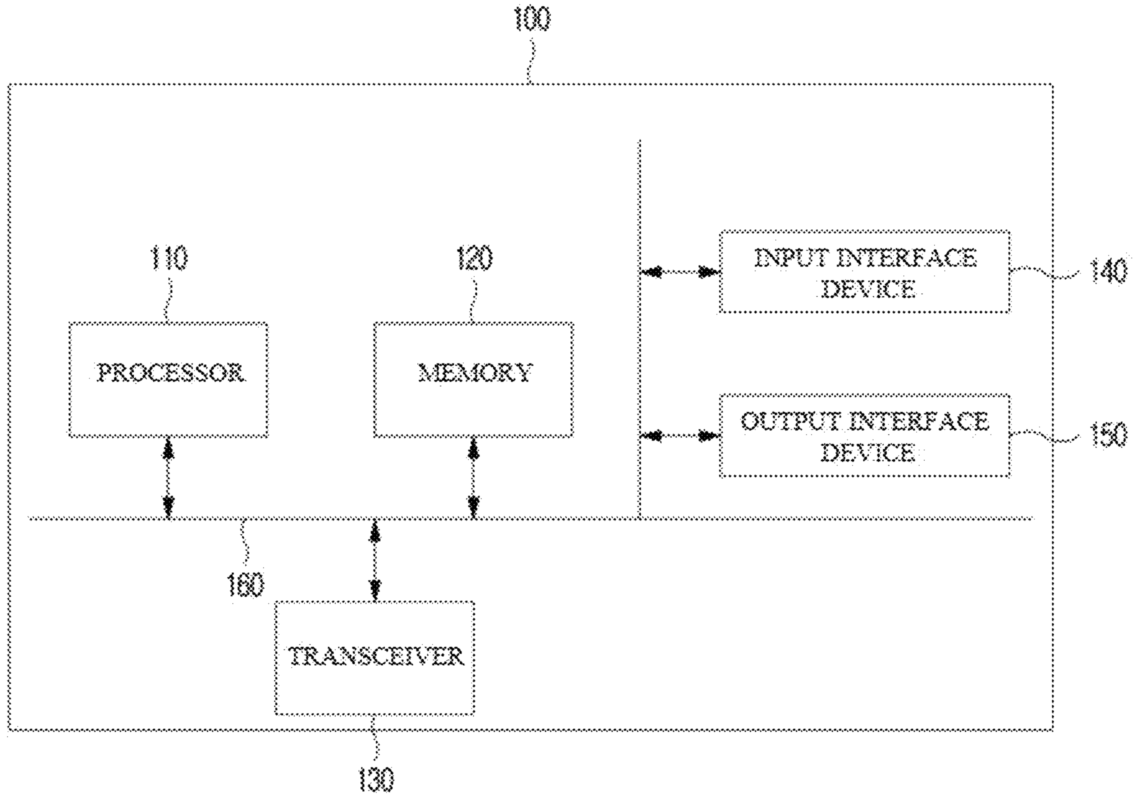
FIG. 7 is a block diagram illustrating an apparatus, according to one embodiment of the present disclosure.

FIG. 7 is a block diagram illustrating an apparatus, according to one embodiment of the present disclosure.

For example, the apparatus 100 may process or compress a plurality of low-resolution images of a specific object obtained from the reflective FPM.

The device 100 may include at least one of a processor 110, a memory 120, a transceiver 130, an input interface device 140, and an output interface device 150. Each component may be connected by a common bus 160 to communicate with each other. In addition, each of the components may be connected through an individual interface or individual bus centered on the processor 110 instead of the common bus 160.

The processor 110 may be implemented in various types such as an Application Processor (AP), a Central Processing Unit (CPU), a Graphic Processing Unit (GPU), and the like, and may be any semiconductor device that executes instructions stored in the memory 120. The processor 110 may execute program commands stored in the memory 120. The processor 110 may perform a method of processing or compressing a plurality of low-resolution images described above based on FIGS. 1 to 6.

For example, the processor 110 may manage and control various devices (e.g., the memory 120, the transceiver 130, etc.) for processing or compressing a plurality of low-resolution images.

Additionally or alternatively, the processor 110 may control the operation described based on FIGS. 1 to 6 to be performed by storing a program command for implementing at least one function of the aforementioned modules in the memory 120. That is, each operation and/or function according to FIGS. 1 to 6 may be executed by one or more processors 110.

The memory 120 may include various types of volatile or non-volatile storage media. For example, the memory 120 may include read-only memory (ROM) and random access memory (RAM). In an embodiment of the present disclosure, the memory 120 may be located inside or outside the processor 110, and the memory 120 may be connected to the processor 110 through various known means.

For example, the memory 120 may store a plurality of low-resolution images obtained from the reflective FPM and/or a virtual low-resolution image corresponding to a location of a specific LED.

The transmission/reception unit 130 may perform a function of transmitting/receiving data processed/to be processed by the processor 110 to/from an external device and/or an external system.

For example, the transceiver 130 may be used for data exchange with other computing devices.

Input interface device 140 is configured to provide data to processor 110. Output interface device 150 is configured to output data from processor 110.

Components described in the exemplary embodiments of the present disclosure may be implemented by hardware elements. For example, The hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in the exemplary embodiments may be implemented as a combination of hardware and software.

The method according to an embodiment of the present disclosure may be implemented as a program that can be executed by a computer, and the computer program may be recorded in various recording media such as magnetic storage media, optical reading media, and digital storage media.

Various techniques described in this disclosure may be implemented as digital electronic circuits or computer hardware, firmware, software, or combinations thereof. The above techniques may be implemented as a computer program product, that is, a computer program or computer program tangibly embodied in an information medium (e.g., machine-readable storage devices (e.g., computer-readable media) or data processing devices), a computer program implemented as a signal processed by a data processing device or propagated to operate a data processing device (e.g., a programmable processor, computer or multiple computers).

Computer program(s) may be written in any form of programming language, including compiled or interpreted languages. It may be distributed in any form, including stand-alone programs or modules, components, subroutines, or other units suitable for use in a computing environment. A computer program may be executed by a single computer or by a plurality of computers distributed at one or several sites and interconnected by a communication network.

Examples of information medium suitable for embodying computer program instructions and data may include semiconductor memory devices (e.g., magnetic media such as hard disks, floppy disks, and magnetic tapes), optical media such as compact disk read-only memory (CD-ROM), digital video disks (DVD), etc., magneto-optical media such as floptical disks, and ROM (Read Only Memory), RAM (Random Access Memory), flash memory, EPROM (Erasable Programmable ROM), EEPROM (Electrically Erasable Programmable ROM) and other known computer readable media. The processor and memory may be complemented or integrated by special purpose logic circuitry.

A processor may execute an operating system (OS) and one or more software applications running on the OS. The processor device may also access, store, manipulate, process and generate data in response to software execution. For simplicity, the processor device is described in the singular number, but those skilled in the art may understand that the processor device may include a plurality of processing elements and/or various types of processing elements. For example, a processor device may include a plurality of processors or a processor and a controller. Also, different processing structures may be configured, such as parallel processors. In addition, a computer-readable medium means any medium that can be accessed by a computer, and may include both a computer storage medium and a transmission medium.

Although this disclosure includes detailed descriptions of various detailed implementation examples, it should be understood that the details describe features of specific exemplary embodiments, and are not intended to limit the scope of the invention or claims proposed in this disclosure.

Features individually described in exemplary embodiments in this disclosure may be implemented by a single exemplary embodiment. Conversely, various features that are described for a single exemplary embodiment in this disclosure may also be implemented by a combination or appropriate sub-combination of multiple exemplary embodiments. Further, in this disclosure, the features may operate in particular combinations, and may be described as if initially the combination were claimed. In some cases, one or more features may be excluded from a claimed combination, or a claimed combination may be modified in a sub-combination or modification of a sub-combination.

Similarly, although operations are described in a particular order in a drawing, it should not be understood that it is necessary to perform the operations in a particular order or order, or that all operations are required to be performed in order to obtain a desired result. Multitasking and parallel processing can be useful in certain cases. In addition, it should not be understood that various device components must be separated in all exemplary embodiments of the embodiments, and the above-described program components and devices may be packaged into a single software product or multiple software products.

Exemplary embodiments disclosed herein are illustrative only and are not intended to limit the scope of the disclosure. Those skilled in the art will recognize that various modifications may be made to the exemplary embodiments without departing from the spirit and scope of the claims and their equivalents.

Accordingly, it is intended that this disclosure include all other substitutions, modifications and variations falling within the scope of the following claims.

What is claimed is:

1. A method performed by an apparatus including at least one transceiver, comprising:

obtaining a plurality of low-resolution images of a specific object from a microscope through the at least one transceiver; and compressing the plurality of low-resolution images, based on i) a first correlation between adjacent low-resolution images among the plurality of low-resolution images, and ii) a second correlation between a virtual low-resolution image corresponding to a location of a specific light emitting diode (LED) obtained through the plurality of low-resolution images and an actual low-resolution image corresponding to the location of the specific LED among the plurality of low-resolution images, wherein the obtaining the virtual low-resolution image corresponding to the location of the specific LED comprises:

obtaining a virtual high-resolution image by applying a super resolution algorithm to a low-resolution image obtained through an LED located in a specific area among an LED array included in the microscope; and obtaining the virtual low-resolution image corresponding to the location of the specific LED based on the virtual high-resolution image, wherein the LED located in the specific area includes an LED located in a central area of the LED array, wherein based on the virtual low-resolution image corresponding to the location of the specific LED, the actual low-resolution image corresponding to the location of the specific LED is corrected, and wherein based on an exposure value of light by the specific LED exceeding a threshold value or an incident angle of light irradiated by the specific LED exceeding a threshold range, the actual low-resolution image corresponding to the location of the specific LED is corrected using the virtual low-resolution image corresponding to the location of the specific LED.

2. The method of claim 1, wherein:

each of the plurality of low-resolution images is arranged based on a location of an LED corresponding to each of the plurality of low-resolution images, and a scanning direction of the arranged plurality of low-resolution images is determined based on a direction of a low-resolution image having a highest first correlation with a specific low-resolution image, among the plurality of low-resolution images.

3. The method of claim 2, wherein:

the microscope includes the LED array including at least one LED, and the specific low-resolution image is obtained through the LED located in the central area of the LED array.

4. The method of claim 2, wherein:

image data based on the plurality of low-resolution images is generated and compressed by scanning the plurality of low-resolution images according to the determined scanning direction.

5. An apparatus for processing or compressing image data, the apparatus comprising:

at least one memory;

at least one transceiver; and at least one processor, wherein the at least one processor is configured to:

obtain a plurality of low-resolution images of a specific object from a microscope through the at least one transceiver; and compress the plurality of low-resolution images, based on i) a first correlation between adjacent low-resolution images among the plurality of low-resolution images, and ii) a second correlation between a virtual low-resolution image corresponding to a location of a specific light emitting diode (LED) obtained through the plurality of low-resolution images and an actual low-resolution image corresponding to the location of the specific LED among the plurality of low-resolution images, wherein the at least one processor is configured to:

obtain a virtual high-resolution image by applying a super resolution algorithm to a low-resolution image obtained through an LED located in a specific area among an LED array included in the microscope; and obtain the virtual low-resolution image corresponding to the location of the specific LED based on the virtual high-resolution image, wherein the LED located in the specific area includes an LED located in a central area of the LED array, wherein based on the virtual low-resolution image corresponding to the location of the specific LED, the actual low-resolution image corresponding to the location of the specific LED is corrected, and wherein based on an exposure value of light by the specific LED exceeding a threshold value or an incident angle of light irradiated by the specific LED exceeding a threshold range, the actual low-resolution image corresponding to the location of the specific LED is corrected using the virtual low-resolution image corresponding to the location of the specific LED.

6. The apparatus of claim 5, wherein:

each of the plurality of low-resolution images is arranged based on a location of an LED corresponding to each of the plurality of low-resolution images, and a scanning direction of the arranged plurality of low-resolution images is determined based on a direction of a low-resolution image having a highest first correlation with a specific low-resolution image, among the plurality of low-resolution images.

7. The apparatus of claim 6, wherein:

the microscope includes the LED array including at least one LED, and the specific low-resolution image is obtained through the LED located in the central area of the LED array.

8. The apparatus of claim 6, wherein:

image data based on the plurality of low-resolution images is generated and compressed by scanning the plurality of low-resolution images according to the determined scanning direction.

9. A system comprising:

a microscope; and an apparatus for processing or compressing image data including at least one transceiver, wherein the microscope obtains a plurality of low-resolution images of a specific object and transmits the plurality of low-resolution images to the apparatus; and the apparatus compresses the plurality of low-resolution images, based on i) a first correlation between adjacent low-resolution images among the plurality of low-resolution images, and ii) a second correlation between a virtual low-resolution image correspondingto a location of a specific light emitting diode (LED) obtained through the plurality of low-resolution images and an actual low-resolution image corresponding to the location of the specific LED among the plurality of low-resolution images, wherein the apparatus is configured to:

obtain a virtual high-resolution image by applying a super resolution algorithm to a low-resolution image obtained through an LED located in a specific area among an LED array included in the microscope; and obtain the virtual low-resolution image corresponding to the location of the specific LED based on the virtual high-resolution image, wherein the LED located in the specific area includes an LED located in a central area of the LED array, wherein based on the virtual low-resolution image corresponding to the location of the specific LED, the actual low-resolution image corresponding to the location of the specific LED is corrected, and wherein based on an exposure value of light by the specific LED exceeding a threshold value or an incident angle of light irradiated by the specific LED exceeding a threshold range, the actual low-resolution image corresponding to the location of the specific LED is corrected using the virtual low-resolution image corresponding to the location of the specific LED.

* * * * *